E. J. Warner,
Can Opener,
N° 19,063.            Patented Jan. 5, 1858.
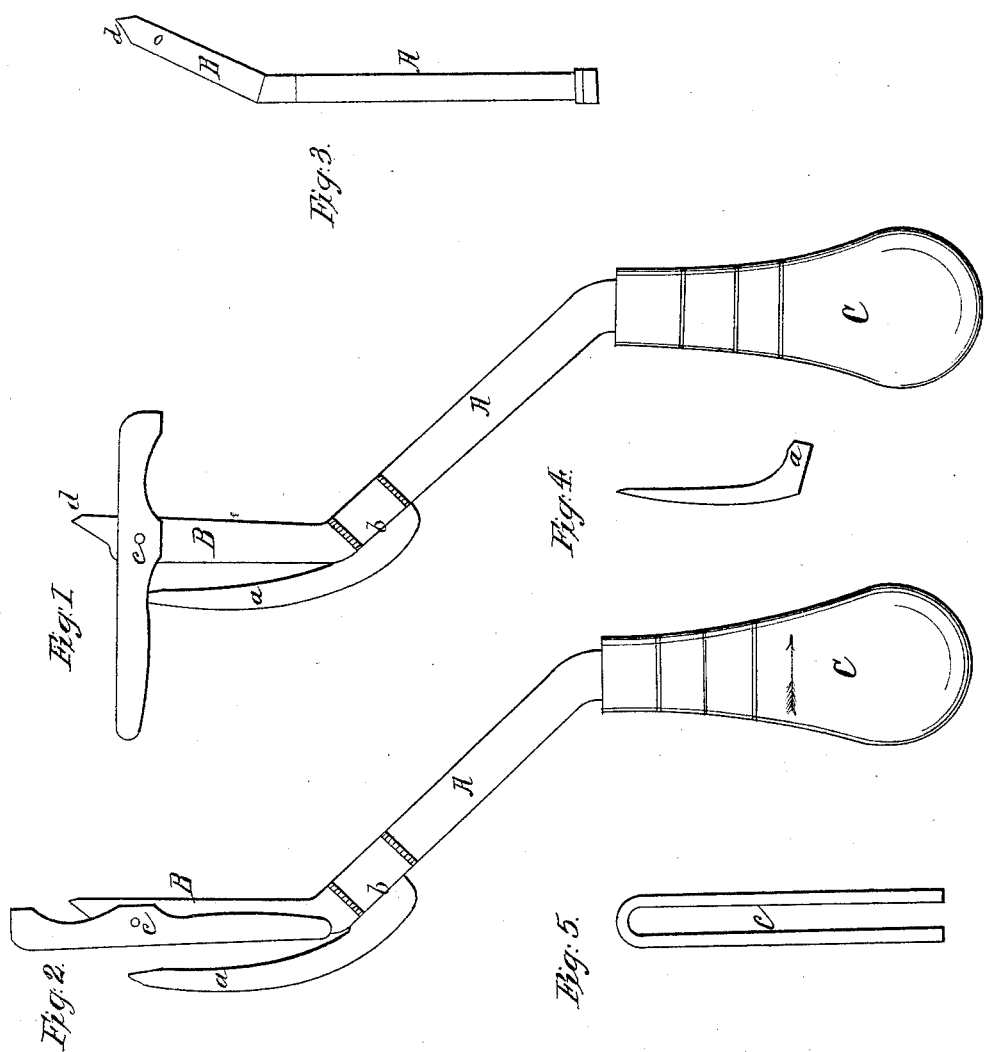

UNITED STATES PATENT OFFICE.

EZRA J. WARNER, OF WATERBURY, CONNECTICUT, ASSIGNOR TO HIMSELF, WM. H. WARNER, AND RUFUS E. HITCHCOCK, OF SAME PLACE.

INSTRUMENT FOR OPENING CANS.

Specification of Letters Patent No. 19,063, dated January 5, 1858.

*To all whom it may concern:*

Be it known that I, EZRA J. WARNER, of the city of Waterbury, in the county of New Haven and State of Connecticut, have invented a new and useful Improvement in Instruments for Cutting Open Sealed Tin Cans and Boxes; and I do hereby declare that the following is a full, clear, and exact description of the construction, character, and operation of the same, reference being had to the accompanying drawings, which make a part of this specification, in which—

Figure 1, is a view of the whole instrument, showing the looped bar, (as Fig. 5,) swung across the piercer bar. Fig. 2, is a view of the same, showing another position of the looped bar. Fig. 3, is a view of the shaft, with the piercer bar. Fig. 4, is a view of the curved cutter, (as in Figs. 1 and 2). Fig. 5, is a view of the looped bar, (as in Figs. 1 and 2.)

I make the shank, A, (including the piercer-bar, B,) of steel, substantially, as represented in Figs. 1, 2, and 3, with a suitable handle, as C, Figs. 1 and 2, and I make the point of the piercer bar, B, substantially, in the form represented at $d$, Figs. 1, 2, &c., I make the curved cutter, $a$, of cast steel, substantially in the form shown in Figs. 1, 2, and 4, and attach it to the shank, A, (as at $b$,) by passing the end, $a$, Fig. 4, into a dovetail slot, so that it may be readily removed, in case of its being injured, or when I desire to change the position of the cutting edge from one side of the looped or swinging bar $c$, to the other or to have it cut in the center, between the two sides, and I bevel the edge on either side, or on both sides, according to the position in which it is to be placed for cutting. I make the looped bar, $c$, of steel, or any other suitable material, substantially in the form shown in Fig. 5, (and indicated in Figs. 1 and 2,) and attach it to the piercer bar, B, (near its end,) by a fulcrum or joint pin, as shown at $c$, Figs. 1 and 2, (and indicated in Fig. 3,) so that it may readily swing, or rock, from the position shown in Fig. 1 to that shown in Fig. 2.

To use this instrument, I swing the loop bar substantially to the position shown at $c$, in Fig. 1, take hold of the handle, C, and press the point, $a$, of the piercer-bar, B, through the tin in the desired place, turn the instrument, and insert the point of the curved cutter, $a$, through the perforation already made, (when the looped or swinging bar, $c$, will be substantially in the position shown in Fig. 2,) and work the handle, C, (in the manner of a brake.) When the handle, C, is moved in the direction indicated by the dart in Fig. 2, the loop bar, $c$, will be held against the surface of the tin, while the curved cutter, $a$, will be forced between its parts and cut the tin smoothly through, and when the handle is moved in the opposite direction the instrument may be pushed forward for another cut, and so on, thus allowing the operator to cut as fast as he can move his hand.

The advantages of my improvement over all other instruments for this purpose consist in the smoothness and rapidity of the cut, as well as the ease with which it is worked, as a child may use it without difficulty, or risk, and in making the curved cutter susceptible of being removed, so that if one should be injured it may be replaced by another, thus saving all the other portions of the instrument, and consequently much expense, and in that the piercer will perforate the tin without causing the liquid to fly out, as it does in all those which make the perforation by percussion of any kind.

What I claim as my invention, and desire to secure by Letters Patent, is—

The combination of the curved cutter, ($a$,) with the looped bar, ($c$,) when constructed, and made to operate; substantially, as herein described.

E. J. WARNER.

Witnesses:
WM. H. WARNER,
R. FITZGERALD.